United States Patent [19]
Marcus

[11] Patent Number: 5,330,104
[45] Date of Patent: Jul. 19, 1994

[54] PORTABLE OUTDOOR MISTER

[76] Inventor: David G. Marcus, 6937 Laurel La., Highland, Calif. 92346

[21] Appl. No.: 908,227

[22] Filed: Jul. 2, 1992

[51] Int. Cl.⁵ .......................... B05B 9/03; B05B 1/14
[52] U.S. Cl. ................................... 239/266; 239/268; 239/273; 261/37
[58] Field of Search .......................... 239/14.1, 17-20, 239/22, 23, 289, 332, 273, 266, 268, 269, 271, 272, 276; 261/37, DIG. 79; 415/119

[56] References Cited

U.S. PATENT DOCUMENTS

| | | | |
|---|---|---|---|
| 648,263 | 4/1900 | Hull | 239/268 |
| 3,188,007 | 6/1965 | Myklebust . | |
| 3,229,450 | 1/1966 | Stern . | |
| 3,727,841 | 4/1973 | Hengesbach | 239/269 |
| 4,189,098 | 2/1980 | Vagner et al. . | |
| 4,508,486 | 4/1985 | Tinker | 415/119 |
| 4,765,542 | 8/1988 | Carlson | 239/289 |
| 4,839,106 | 6/1989 | Steiner . | |
| 4,852,802 | 8/1989 | Iggulden et al. | 239/70 |
| 4,854,502 | 8/1989 | Cox | 239/289 |
| 5,111,529 | 5/1992 | Glucksman . | |
| 5,121,882 | 6/1992 | Skidmore | 239/269 |

OTHER PUBLICATIONS

Siemens Data Sheet-Model M5 Photovoltaic Module; Sismens Solar Industries, Camarillo, Calif.; 2 pp.; no date.

*Primary Examiner*—Karen B. Merritt
*Attorney, Agent, or Firm*—Sheldon & Mak

[57] ABSTRACT

Disclosed is apparatus for providing a comfortable region within a relatively hot, dry environment having a reservoir of water therein, including a container having a base, sides, and an openable lid; a self-priming pump mounted to the base and having a pump inlet and a pump outlet; an electrical battery having a liquidic electrolyte for powering the pump; a spray wand having a plurality of nozzles spaced along a substantially rigid conduit for distributing the water in the form of a corresponding number of expanding fine spray streams; a fluid conduit for connection to the pump and the nozzles for misting the environment, the container substantially absorbing noise from operation of the pump and protecting against contamination of the environment by leakage of the electrolyte from the battery; and a solar panel located on the lid of the container for recharging the battery.

11 Claims, 2 Drawing Sheets

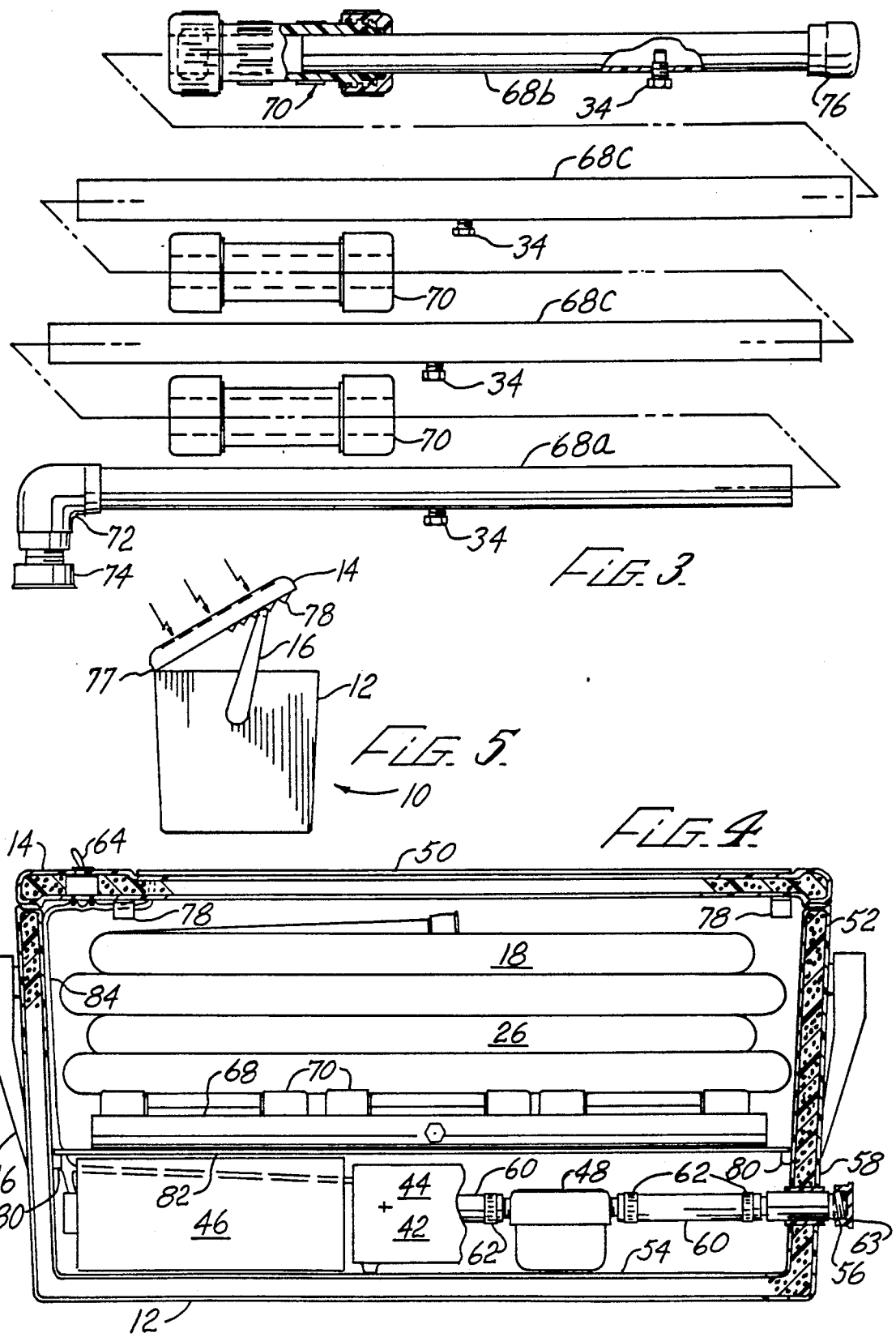

PORTABLE OUTDOOR MISTER

BACKGROUND

The present invention relates to air humidifying apparatus for use particularly in hot, dry, outdoor environments.

It is known that water evaporation is particularly effective as a coolant when ambient air has low humidity. It is also known that comfort levels are enhanced in extremely dry environments by elevating to moderately dry the relative humidity.

Misting devices such as those associated with greenhouse agriculture have been used for air conditioning of outdoor environments. However, the misting devices of the prior art exhibit one or more of the following disadvantages:

1. They are ineffective in that they do not provide a desired uniformity and coverage of the misting;
2. They are hard to use in that the misting nozzles are difficult to support in desired locations;
3. They are unsuitable for use in many outdoor locations because they require a source of water under pressure; and
4. They are awkward to relocate and/or to store when not in use.

Thus there is a need for a misting apparatus for outdoor environments that is portable, easy to use and store, unobtrusive, and effective for uniformly misting.

SUMMARY

The present invention provides a portable misting apparatus that meets this need, for use in a hot, dry environment having a water reservoir therein. In one aspect of the invention, the apparatus includes a base; a self-priming pump mounted to the base and having a pump inlet and a pump outlet; means for powering the pump; an inlet hose for connecting the pump inlet to the reservoir; a spray wand having a plurality of nozzle means spaced along a substantially rigid conduit for distributing the water in the form of a corresponding number of expanding fine misting spray streams; and an outlet hose for connecting the pump outlet to the nozzle means.

Preferably the rigid conduit has a plurality of modular conduit portions for ease of storage, and means for connecting the conduit portions. Preferably the means for connecting can transmit shear forces and bending moments between adjacent conduit portions for permitting suspension of at least one of the conduit portions horizontally disposed relative to an elevated external support. The base can form a container for the pump and the means for powering the pump, and wherein the modular conduit portions together with the nozzle means, and the means for connecting are storable within the container.

In another aspect of the invention, the apparatus includes a sound-absorbing container having a base portion, side portions, and an openable lid portion; a self-priming pump mounted within the container and having a pump inlet and a pump outlet; electrical battery means for powering the pump; the nozzle means; and fluid conduit means for connection to the pump and the nozzle means for misting the environment, the container substantially absorbing noise from operation of the pump. The container can include an inner shell portion, and outer shell portion, and an insulative material sealingly confined between the shell portions. The container can include means for sealingly connecting the lid portion to the side portions.

The fluid conduit means can protrude at least one wall of the container. The battery means can have a liquidic electrolyte, the wall and base portions of the container being preferably water-tight for protecting against contamination of the environment by leakage of the electrolyte from the battery means. The container can include means for sealingly connecting the lid portion to the side portions.

In a further aspect of the invention, the apparatus can include the container, the self-priming pump, the electrical battery means, the spray wand, and the fluid conduit means, the container substantially absorbing noise from operation of the pump and protecting against contamination of the environment by leakage of the electrolyte from the battery means.

In yet another aspect of the invention, the apparatus includes the container, the self-priming pump, the electrical battery means, the spray wand, the fluid conduit means, and solar panel means located on the lid portion of the container for recharging the battery means. The lid portion can be hingedly connected to a side portion of the container. Preferably the container further includes a rigid carrying handle, opposite ends of the handle being pivotally connected to corresponding sides of the container for movement between an upright carrying position and a folded position, the lid portion having at least one detent member for engaging the handle whereby the lid portion is supported in a partially open position by the handle for orienting the solar panel normal to received sunlight.

DRAWINGS

These and other features, aspects, and advantages of the present invention will become better understood with reference to the following description, appended claims, and accompanying drawings, where:

FIG. 3 is a side exploded view of a modular nozzle portion of the apparatus of FIG. 1;

FIG. 4 is a side elevational sectional view of the apparatus of FIG. 1 in a storage configuration; and FIG. 5 is an end elevational view of the apparatus of FIG. 1 showing a lid portion thereof being supported in an inclined orientation.

DESCRIPTION

Figure 1:
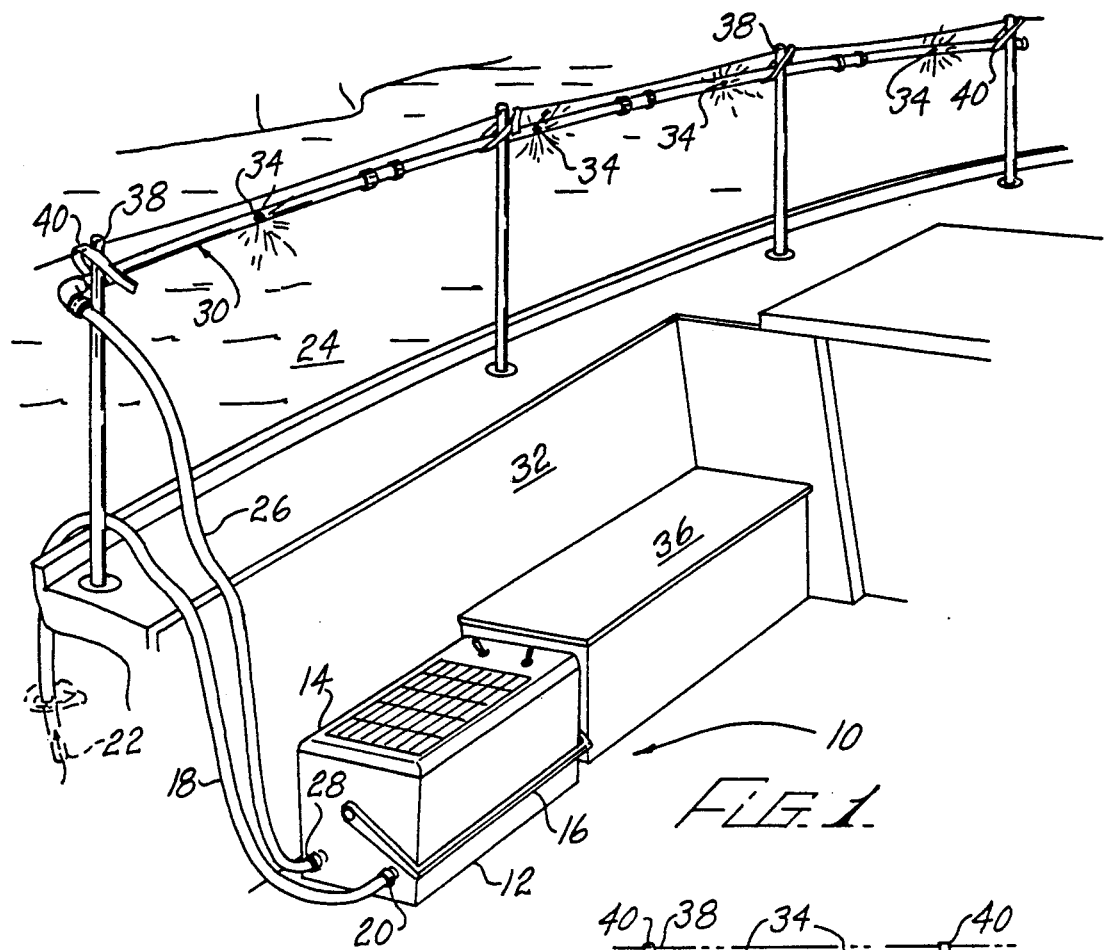
FIG. 1 is a fragmentary elevational perspective view of a water craft having a portable misting apparatus according to the present invention.

The present invention is directed to a portable solar-powered misting apparatus for cooling hot, dry environments. With reference to FIGS. 1-5 of the drawings, exemplary misting apparatus 10 according to the present invention includes a housing 12 having an openable lid 14 and a pivotable handle 16, an inlet hose 18 being connected to an inlet port 20 that protrudes from the housing 12, the hose 18 having a free end 22 for receiving water from a reservoir 24 or other source thereof as indicated by the arrow in FIG. 1. Generally, the reservoir 24 can be provided by a lake, stream, pond, swimming pool, ice chest, bucket, or the like. An outlet hose 26 is connected an outlet port 28 and a spray wand assembly 30, the outlet port 28 also protruding from the housing 12.

As further shown in FIG. 1, the apparatus 10 is depicted in use on a boat or water craft 32, the wand assembly 30 having a spaced plurality of nozzles 34 for misting an environment space 36 to be occupied by users of the water craft 32. The water craft 32, which forms no part of the present invention, has an elevated life-line or other structure 38 to which the wand assembly 30 is supportively mounted by a plurality of straps 40, the straps 40 having hook-loop (Velcro ®) fasteners for securing the straps 40 in a closed loop configuration. Other examples of the structure 38 include a shade canopy, a tent, a post, a line that is strung between two trees, and the back of a park bench.

Figure 2:
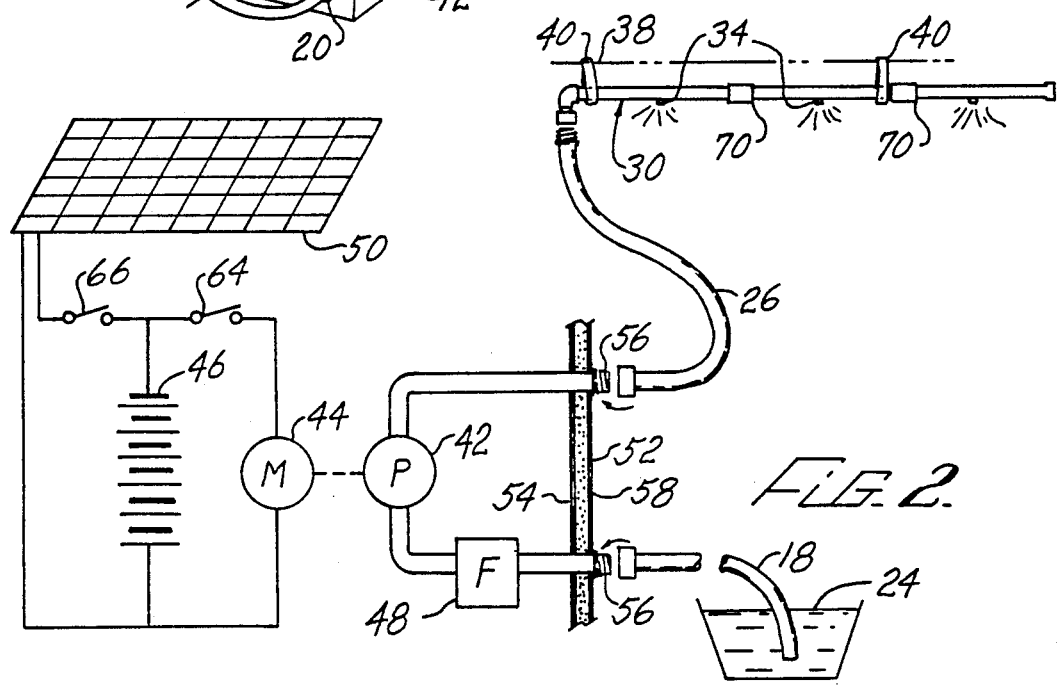
FIG. 2 is a pictorial schematic diagram of the apparatus of FIG. 1.

With particular reference to FIG. 2, a pump 42 that is located within the housing 12 is connected between the inlet port 20 and the outlet port 28 for feeding water to the wand assembly 30 from the reservoir 24, the pump 42 having an associated motor 44 that is powered by a rechargeable battery 46. A particulate filter 48 is also connected between the inlet port 20 and the pump 42 for protecting same, and for excluding debris that might be present in the reservoir 24 from reaching the wand assembly 30. The apparatus 10 also includes a solar cell array 50 that is mounted to the lid 14 for recharging the battery 46.

An important feature of the present invention is that the housing 12 is effective for significantly attenuating noise associated with the pump 42, particularly when the lid 14 is closed. For this purpose, the housing 12 and the lid 14 have respective layers of a sound deadening material 52. Also, the housing 12 has a water-tight liner 54 that is effective for confining harmful liquid or other material in case of leakage from the battery 46. In further accordance with the present invention, the housing 12 is adapted for holding the hoses 18 and 26 as well as the wand assembly 30 as described below for convenient transport and storage of the apparatus 10 as further described herein.

As best shown in FIG. 4, the ports 20 and 28 are configured as hose bib fittings 56 that sealingly protrude an end wall 58 of the housing 12, the connections to the filter 48 and the pump 42 being made by short lengths of flexible hose 60 and conventional hose clamps 62. The inlet hose 18 and the outlet hose 26 are convenient lengths of conventional garden hose, the inlet hose 18 being configured with sufficient wall stiffness for preventing collapse of the hose 18 when the housing 12 is significantly elevated above the reservoir 24. A pair of bib caps 63 can protectively cover the hose bib fittings 56 when the apparatus 10 is not in use.

As further shown in FIGS. 1, 2, and 4, a motor switch 64 is connected between the battery 46 and the motor 44 of the pump 42 for controlling same, a charging switch 66 being similarly connected between the battery 46 and the solar cell array 50 for preventing overcharging of the battery 46.

As further shown in FIGS. 1-3, the wand assembly 30 is modular, having a plurality of spray segments 68, including an inlet segment 68a, an end segment 68b, and a pair of intermediate segments 68c, a plurality of coupling assemblies 70 being used for end-to-end connection of the respective segments 68.

Each of the segments 68 is provided with one or more of the nozzles 34, the inlet segment 68a also having an elbow fitting 72 that is provided with a hose bib coupling 74 for connection to the outlet hose 26. The end segment 68b is sealingly closed by a terminating cap 76. The segments 68 are formed of tubing having sufficient strength and durability for support of the wand assembly 30 by a conveniently spaced plurality of the straps 40, without being harmed by routine assembly and disassembly of the wand assembly 30. The nozzles 34 sealingly threadingly engage the respective segments 68. A convenient and advantageous configuration of the wand assembly 30 has the segments 68 made from lengths of conventional ½" schedule 40 plastic tubing, the elbow 72 and the cap 76 being similarly conventional plastic plumbing fittings. A coupling advantageously suitable for use as the coupling assembly 70 is commercially available as ½"×4" slip joint union Model 53/20 (PVC), available from Home Depot of San Bernardino, Calif. Misting nozzles suitable for use as the nozzles 34 are available as Monarch M-1 mister with in-line filter from Ace Hardware of 1000 Palms, Calif.

Alternatively, the segments 68 can be formed from high-strength aluminum alloy tubing, having 0.5 inch diameter and 0.06 wall thickness or similar cross-section, the elbow fitting 72 and the cap 76 being compatibly formed of aluminum, the coupling assemblies 70 being ½" "cam & groove" couplings of the type that are commercially provided for connecting fire hoses, each being available from KH Metals & Supply of Riverside, Calif.

The housing 12, including the lid 14 and the handle 16, can be formed of a Coleman 28 qt. single handle cooler from K-Mart of San Bernardino, Calif. The lid 14, being preferably hinged to a side portion of the housing 12 as indicated at 77 in FIG. 5, is also preferably provided with a pair of detent members 78 for permitting the solar cell array 50 together with the lid 14 to be adjustably propped up by the handle 16. This feature of the present invention conveniently permits the array 50 to be optionally oriented for enhancing exposure thereof by incoming sunlight, as well as permitting objects to be moved into and out of the housing 12 without handling the lid 14.

As further shown in FIG. 4, the housing is preferably provided with at least a pair of cleat members 80 for supporting a shelf member 82 horizontally disposed within the housing 12 and above the pump 42, the battery 46, the filter 48, the hoses 60 and related hardware. The shelf member 82, which is preferably made of a rigid, transparent plastic material for visual inspection of the covered components, provides an uncluttered support for the components of the wand assembly 30 as well as the inlet hose 18 and the outlet hose 26. The switches 64 and 66 can be mounted to the lid 14 as shown in the drawings, an wiring harness 84 extending between the array 50 and the switches 64 and 66 on the lid 14 to the motor 44 and the battery 46 beneath the shelf member 82 for electrically connecting same as further described relative to FIG. 2. The solar array 50 can also be mounted flush with the lid 14 as shown in FIG. 4.

A pump suitable for use as the pump 42 is available as a 40 psi three gallon per minute 12 volt Surflo pump from Camping World of San Bernardino, Calif. A battery suitable for use as the battery 46 is a Power Sonic 12 volt 12 AH gel-cell battery available from Solar Electric Specialties Co. of Santa Barbara, Calif. A solar cell panel suitable for use as the solar cell array 50 is available as Siemens M-5 5 watt (19.5 VDC max), also from Solar Electric Specialties Co.

Although the present invention has been described in considerable detail with reference to certain preferred versions thereof, other versions are possible. For example, the motor 44 and the battery 46 can be mounted to the lid 14, thereby shortening the harness 84, the pump (and associated plumbing) being either also relocated to the lid 14 or alternatively powered through a mechanical coupling that allows for movement of the lid 14. Also, the housing 14 can provide a back-up alternative to the reservoir 24, a suitable valve being interposed between the filter 48 and the inlet port 20. Further, one or more voltage display indicators can be mounted to the lid 14 for showing the condition of the battery 46. The apparatus 10 can also operate from a conventional pressure source of water, the pump 42 having a bypass check-valve that allows free passage of the water from the inlet port 20 through the filter 48 to the outlet port 28. Therefore, the spirit and scope of the appended claims should not necessarily be limited to the description of the preferred versions contained herein.

What is claimed is:

1. Apparatus for providing a comfortable region within a relatively hot, dry environment having a reservoir of water therein, comprising:
   (a) a self-priming pump having a pump inlet and a pump outlet;
   (b) electrical battery means having a liquidic electrolyte for powering the pump;
   (c) a container having a base portion, side portions, and an openable lid portion, the pump being mounted to the base portion, the lid portion being hingedly connected to a side portion of the container, the container substantially absorbing noise from operation of the pump and protecting against contamination of the environment by leakage of the electrolyte from the battery means;
   (d) a spray wand having a plurality of nozzle means spaced along a substantially rigid conduit for distributing the water in the form of a corresponding number of expanding fine spray streams;
   (e) fluid conduit means for connection to the pump and the nozzle means for misting the environment;
   (f) solar panel means located on the lid portion of the container for recharging the battery means; and
   (g) a holder for supporting the lid portion in a partially open position by the holder for orienting the solar panel means normal to received sunlight.

2. The apparatus of claim 1, wherein the holder comprises a rigid carrying handle, opposite ends of the handle being pivotally connected to corresponding sides of the container for movement between an upright carrying position and a folded position and having intermediate positions for supporting the lid portion partially open.

3. The apparatus of claim 2, wherein the holder further comprises at least one detent member on the lid portion for engaging the handle.

4. Apparatus for providing a comfortable region within a relatively hot, dry environment having a reservoir of water therein, comprising:
   (a) a container having a base portion, side portions, and an openable lip portion, the lid portion being hingedly connected to a side portion of the container;
   (b) a self-priming pump mounted to the base portion and having a pump inlet and a pump outlet;
   (c) electrical battery means;
   (d) nozzle means for distributing the water in the form of a fine spray stream;
   (e) fluid conduit means for connection to the pump and the nozzle means for misting the environment;
   (f) solar panel means located on the lid portion of the container for recharging the battery means; and
   (g) a holder for supporting the lid portion in a partially open position by the holder for orienting the solar panel means normal to received sunlight.

5. The apparatus of claim 4, wherein the container comprises an inner shell portion, an outer shell portion, and an insulative material sealingly confined between the shell portions.

6. The apparatus of claim 5, wherein the container includes means for sealingly connecting the lid portion to the side portions.

7. The apparatus of claim 4, wherein the fluid conduit means protrudes at least one side portion of the container.

8. The apparatus of claim 4, wherein the battery means has a liquidic electrolyte, and wherein the side and base portions of the container are water-tight protecting against contamination of the environment by leakage of the electrolyte from the battery means.

9. The apparatus of claim 8, wherein the container includes means for sealingly connecting the lid portion to the side portions.

10. The apparatus of claim 4, wherein the holder comprises a rigid carrying handle, opposite ends of the handle being pivotally connected to corresponding sides of the container for movement between an upright carrying position and a folded position and having intermediate positions for supporting the lid portion partially open.

11. The apparatus of claim 10, wherein the holder further comprises at least one detent member on the lid portion for engaging the handle.

* * * * *